United States Patent
Schwefer et al.

(10) Patent No.: US 7,744,839 B2
(45) Date of Patent: Jun. 29, 2010

(54) METHOD FOR REDUCING THE NITROGEN OXIDE CONCENTRATION IN GASES

(75) Inventors: Meinhard Schwefer, Meschede (DE); Rolf Siefert, Rheda-Wiedenbrück (DE); Michael Groves, Gevelsberg (DE)

(73) Assignee: Uhde GmbH, Dortmund (DE)

( * ) Notice: Subject to any disclaimer, the term of this patent is extended or adjusted under 35 U.S.C. 154(b) by 84 days.

(21) Appl. No.: 11/913,450

(22) PCT Filed: Apr. 27, 2006

(86) PCT No.: PCT/EP2006/003895

§ 371 (c)(1), (2), (4) Date: Mar. 25, 2008

(87) PCT Pub. No.: WO2006/119870

PCT Pub. Date: Nov. 16, 2006

(65) Prior Publication Data

US 2008/0241034 A1      Oct. 2, 2008

(30) Foreign Application Priority Data

May 11, 2005    (DE)   ........................ 10 2005 022 650

(51) Int. Cl.
*B01D 53/56* (2006.01)
(52) U.S. Cl. .................. 423/239.1; 423/239.2
(58) Field of Classification Search .............. 423/239.1, 423/239.2
See application file for complete search history.

(56) References Cited

U.S. PATENT DOCUMENTS

| | | |
|---|---|---|
| 4,571,329 A | 2/1986 | Kato et al. |
| 7,462,340 B2 * | 12/2008 | Schwefer et al. ......... 423/239.1 |
| 2002/0044902 A1 | 4/2002 | Delahay et al. |
| 2002/0127163 A1 | 9/2002 | Chen et al. |
| 2003/0143141 A1 | 7/2003 | Schwefer et al. |
| 2004/0109805 A1 | 6/2004 | Schwefer et al. |
| 2005/0244320 A1 | 11/2005 | Schwefer et al. |
| 2006/0051277 A1 | 3/2006 | Schwefer et al. |

FOREIGN PATENT DOCUMENTS

| | | |
|---|---|---|
| DE | 10226461 A1 | 1/2004 |
| WO | WO-00/48715 A1 | 8/2000 |
| WO | WO-01/51181 A1 | 7/2001 |
| WO | WO-02/087733 A1 | 11/2002 |
| WO | WO-03/084646 A1 | 10/2003 |
| WO | WO-03/105998 A1 | 12/2003 |

* cited by examiner

*Primary Examiner*—Timothy C Vanoy
(74) *Attorney, Agent, or Firm*—Connolly Bove Lodge & Hutz LLP

(57) ABSTRACT

The method comprises passing an $N_2O$- and $NO_x$-containing gas over a sequence of two catalyst beds, adding reducing agents for $NO_x$ and for $N_2O$ between the catalyst beds in such an amount that not only $NO_x$ but also a predetermined proportion of $N_2O$ is reduced. The reaction conditions are set so that the $N_2O$ content of the gas is reduced by not more than 95%, based on the $N_2O$ content at the entrance of the first catalyst bed, by decomposition to nitrogen and oxygen in the first catalyst bed and that not only chemical reduction of $NO_x$ but also chemical reduction of $N_2O$ occurs in the second catalyst bed so that the $N_2O$ content of the gas is reduced by at least 50%, based on the $N_2O$ content at the entrance of the second catalyst bed.

19 Claims, No Drawings

METHOD FOR REDUCING THE NITROGEN OXIDE CONCENTRATION IN GASES

RELATED APPLICATIONS

This application is a national stage application (under 35 U.S.C. §371) of PCT/EP20061003895, filed Apr. 27, 2006, which claims benefit of German application 10 2005 022 650.7, filed May 11, 2005.

The present invention relates to a method of reducing the content of nitrogen oxides in gases.

In many processes, e.g. combustion processes or in the industrial production of nitric acid, an offgas laden with nitrogen monoxide NO, nitrogen dioxide $NO_2$ (together referred to as $NO_x$) and nitrous oxide $N_2O$ is obtained. Both NO and $NO_2$ and also $N_2O$ are known as compounds having ecotoxicological relevance (acid rain, smog formation, destruction of stratospheric ozone). For reasons of environmental protection, there is therefore an urgent need for industrial solutions for eliminating nitrous oxide emissions together with the $NO_x$ emissions.

Apart from the separate elimination of $N_2O$ and of $NO_x$, combined methods for eliminating these nitrogen oxides have been proposed.

WO-A-00/48715 discloses a method in which an $NO_x$- and $N_2O$-containing offgas is passed over an iron zeolite catalyst of the beta type at temperatures of from 200 to 600° C. Ammonia was added to the offgas in a ratio of from 0.7 to 1.4 based on the total amount of $NO_x$ and $N_2O$. Ammonia here serves as reducing agent both for $NO_x$ and for $N_2O$.

WO-A-03/84646 discloses a method in which an $NO_x$- and $N_2O$-containing gas is admixed with a nitrogen-containing reducing agent in at least the amount required for complete reduction of the $NO_x$, hydrocarbon, carbon monoxide and/or hydrogen is also added to the gas to reduce the $N_2O$ and this mixture is then introduced into at least one reaction zone containing one or more iron-laden zeolites at temperatures of up to 450° C.

WO-A-01/51,181 discloses a method of removing $NO_x$ and $N_2O$, in which a process gas or offgas is passed through two reaction zones which contain iron-laden zeolites as catalysts. In the first reaction zone, $N_2O$ is catalytically decomposed to nitrogen and oxygen, ammonia is added to the gas mixture between the first and second reaction zones and in the second reduction zone $NO_x$ is chemically reduced by reaction with ammonia. The method employs comparatively small amounts of ammonia, since the reducing agent is only used for the reduction of the $NO_x$.

A further development of the method known from WO-A-01/51,181 is disclosed in WO-A-03/105,998. Here, a process gas or offgas is passed at superatmospheric pressure through two reaction zones containing iron-laden zeolites as catalysts. However, a maximum of 90% of the $N_2O$ present in the gas is catalytically decomposed to nitrogen and oxygen in the first reaction zone. A reducing agent for $NO_x$ is subsequently added to the gas mixture between the first and second reaction zones so that $NO_x$ is reduced in this second reaction zone. In addition, the $N_2O$ remaining from the first stage is at least partly decomposed to nitrogen and oxygen in this second stage. In this method too, only the amount of reducing agent required for reduction of the $NO_x$ is added to the gas mixture.

The abovementioned two-stage methods of eliminating $NO_x$ and $N_2O$ have the advantage that no reducing agent has to be used for the catalytic decomposition of $N_2O$. Offgases from industrial processes can contain considerable amounts of $N_2O$. Thus, for example, offgases from the nitric acid process generally contain significantly larger amounts of $N_2O$ than of $NO_x$. These two-stage methods of decomposing $N_2O$ are thus very economical from the point of view of consumption of reducing agent. However, these methods have the disadvantage that the catalytic decomposition of $N_2O$ is a first-order reaction. This has the consequence that when the purity of the treated offgas or the degree of decomposition of $N_2O$ has to meet high standards, the catalyst usage increases exponentially and very large amounts of catalyst would have to be used.

In the case of methods which bring about the decrease in the content of nitrogen oxides, i.e. of $NO_x$ and of $N_2O$, by chemical reduction, like the methods known from WO-A-00/48,715 or WO-A-03/84,646, the limitation imposed on the degree of decomposition by the amount of catalyst is of only subordinate importance. Compared to two-stage methods, the joint reduction of $NO_x$ and $N_2O$ has the advantage that the catalyst volume required for high degrees of decomposition of $N_2O$ can be significantly smaller, since the $N_2O$ reduction over a wide temperature range does not depend exponentially on the catalyst volume but instead is influenced essentially only by the amount of reducing agent added. However, a disadvantage is that correspondingly large amounts of reducing agent are required to eliminate the content of nitrogen oxides, in particular $N_2O$.

The present invention combines the advantages of the above-described single- and two-stage methods without their disadvantages becoming evident.

It has now surprisingly been found that the effectiveness and economics of the method known from WO-A-03/105,998 can be significantly improved further when not only the reducing agent for $NO_x$ but also a reducing agent for $N_2O$ is added to the gas mixture after leaving the first stage, so that chemical reduction of the $N_2O$ occurs in addition to the chemical reduction of the $NO_x$ in the second stage.

It is an object of the present invention to provide a simple but economical method which gives good conversions both for $NO_x$ removal and for $N_2O$ removal together with minimal operating and capital costs. The method of the invention requires particularly small amounts of catalyst and at the same time meets high standards in terms of the purity of the treated gas mixture and has a relatively low consumption of reducing agent.

This object is achieved by the method of the invention.

The invention provides a method of reducing the content of $NO_x$ and $N_2O$ in gases, in particular in process gases and offgases, which comprises the measures:

a) passage of the $N_2O$- and $NO_x$-containing gas over two catalyst beds of which the first containing a catalyst for the decomposition of $N_2O$ into nitrogen and oxygen and the second catalyst bed containing a catalyst for the chemical reaction of $NO_x$ and $N_2O$ with a reducing agent, b) selection of temperature, pressure and space velocity in the first catalyst bed so that the decrease in the $N_2O$ content of the gas occurring in this is not more than 95%, based on the $N_2O$ content at the entrance of the first catalyst bed, and c) addition of a reducing agent for $NO_x$ and a reducing agent for $N_2O$ between the first and second catalyst beds in an amount sufficient for chemical removal of all of the $NO_x$ and at least 50% of the $N_2O$, based on the $N_2O$ content at the entrance of the second catalyst bed.

While the $N_2O$ removal in the first catalyst bed occurs exclusively by catalytic decomposition into nitrogen and oxygen, the decrease in the $N_2O$ content in the second catalyst bed is brought about predominantly by the reducing agent. Thus, the control of the decrease in the content of $N_2O$ in the method of the invention occurs in a different way than in the method known from WO-A-03/105,998 as a result of the addition of the reducing agent for $N_2O$, so that chemical reduction of $N_2O$ occurs in addition to the removal of $NO_x$. As a result of the use of reducing agents for removal of $N_2O$, the use of comparatively small amounts of catalyst is possible. The amount of catalyst in the first catalyst bed can also be reduced by, at given operating parameters such as temperature, pressure and volume flow of the gas, reducing the percentage of the $N_2O$ to be removed in this stage and correspondingly increasing the percentage of the $N_2O$ to be removed in the second stage.

The method of the invention thus makes it possible to carry out the reduction of the content of both $N_2O$ and $NO_x$ at a low operating temperature and at economical space velocities in the presence of relatively small amounts of reducing agents and at the same time to achieve very high degrees of removal of $N_2O$ and $NO_x$.

In the case of an offgas from a nitric acid plant, the content of $N_2O$ after leaving the first catalyst bed in the method of the invention is preferably above 50 ppm, particularly preferably above 100 ppm and in particular above 150 ppm. The reduction in the $N_2O$ content present at the beginning of the first catalyst bed which occurs in the first catalyst bed is not more than 95%, preferably not more than 90%, in particular from 50 to 90%, particularly preferably from 70 to 90%.

After leaving the first catalyst bed, the $N_2O$- and $NO_x$-containing gas is mixed with a reducing agent for $NO_x$ and a reducing agent for $N_2O$. The same chemical compound, for example ammonia, can be used for both purposes or the chemical compounds added can be different, for example ammonia and hydrocarbons. The addition of the reducing agents can occur at one location directly after the first catalyst bed or the reducing agents can be fed in at different locations, i.e. the second catalyst bed can be divided into a zone for $NO_x$ reduction and a downstream zone for $N_2O$ reduction.

In the second catalyst bed, complete elimination of the $NO_x$ occurs and in addition an at least 50% reduction, preferably at least 70% reduction, in the $N_2O$ content present at the beginning of the second catalyst bed occurs.

For the purposes of the present description, complete elimination of the $NO_x$ means a reduction in the proportion of $NO_x$ in the gas mixture down to a residual content of less than 20 ppm, preferably less than 10 ppm, particularly preferably less than 5 ppm and very particularly preferably less than 1 ppm.

The temperature of the gas stream in the first catalyst bed in which only the $N_2O$ is removed and also in the second catalyst bed in which $N_2O$ and $NO_x$ are removed is, according to the invention, below 500° C., preferably in the range from 300 to 450° C. and very particularly preferably from 350 to 450° C. The temperature on entering the second catalyst bed preferably corresponds to the temperature at the exit from the first catalyst bed. In the case of physical separation of the catalyst beds, it is possible to adjust the temperature of the second catalyst bed or of the gas stream entering it by removal or introduction of heat so that it is lower or higher than that of the first catalyst bed. The temperature of an individual catalyst bed can advantageously be determined as the arithmetic mean of the temperature of the gas stream at the entrance to and exit from the catalyst bed.

The choice of operating temperature is, like the space velocities chosen, determined by the desired degree of removal of $N_2O$.

The pressure, temperature, volume flow and amount of catalyst in the first catalyst bed are selected so that not more than 95%, preferably not more than 90%, in particular from 50 to 90% and very particularly preferably from 70 to 90%, of the $N_2O$ present at the beginning of the first catalyst bed are decomposed there.

The amount of reducing agent or reducing agent mixture, pressure, temperature, volume flow and amount of catalyst in the second catalyst bed are selected so that, in addition to the complete reduction of the $NO_x$, a further decrease in the $N_2O$ content of the gas of at least 50%, based on the $N_2O$ content at the entrance of the second catalyst bed, occurs there as a result of chemical reduction.

The method of the invention is generally carried out at a pressure in the range from 1 to 50 bar, preferably at a superatmospheric pressure of at least 2 bar, in particular at least 3 bar, very particularly preferably from 4 to 25 bar, with a higher operating pressure reducing the consumption of reducing agent and by-product formation.

For the purposes of the present description, the term space velocity refers to the volume of gas mixture (measured at 0° C. and 1.014 bara) per hour divided by the volume of catalyst. The space velocity can thus be adjusted via the volume flow of the gas and/or via the amount of catalyst.

The gas laden with nitrogen oxides is usually passed over the catalyst at a space velocity of from 200 to 200 000 $h^{-1}$, preferably from 5000 to 100 000 $h^{-1}$, in particular from 5000 to 50 000 $h^{-1}$, based on the summed catalyst volume of the two catalyst beds.

Reducing agents which can be used for the purposes of the invention are substances which display a high activity for the reduction of $NO_x$ or of $N_2O$.

Examples of suitable reducing agents are nitrogen-containing reducing agents, hydrocarbons, carbon monoxide, hydrogen or mixtures of two or more of these compounds.

As nitrogen-containing reducing agents, it is possible to employ any compounds as long as they are able to reduce $NO_x$ and/or $N_2O$. Examples of such reducing agents are hydrogen compounds of nitrogen, e.g. azanes, hydroxyl derivatives of azanes, and also amines, oximes, carbamates, urea and urea derivatives.

Examples of azanes are hydrazine and very particularly preferably ammonia.

An example of a hydroxyl derivative of azanes is hydroxylamine.

Examples of amines are primary aliphatic amines such as methylamine.

An example of a carbamate is ammonium carbamate.

Examples of urea derivatives are N,N'-substituted ureas such as N,N'-dimethylurea. Ureas and urea derivatives are preferably used in the form of aqueous solutions.

Examples of hydrocarbons are methane, ethane, ethene, propane, propene, butane and isobutane and hydrocarbon-containing mixtures such as natural gas or synthesis gas.

Particular preference is given to ammonia or substances which liberate ammonia on introduction, e.g. urea or ammonium carbamate.

As reducing agents for $NO_x$ and as reducing agents for $N_2O$, preference is given to using nitrogen-containing reducing agents, in particular ammonia.

A further preferred combination is ammonia as reducing agent for $NO_x$ and hydrocarbons as reducing agent for $N_2O$.

In the method of the invention, the amount of reducing agent added is appreciably greater than that required for reducing of $NO_x$ under the selected reaction conditions (pressure, temperature, space velocity).

The reducing agents are added in the amounts required for reduction of all of the $NO_x$ and at least 50% of the part of the $N_2O$ remaining in the second catalyst bed. The amounts of reducing agent required for this depend on the type of reducing agent and can be determined by a person skilled in the art by means of routine experiments.

In the case of ammonia as reducing agent for $NO_x$ use is made of from 0.9 to 2.5 mol, preferably from 0.9 to 1.4 mol, particularly preferably from 1.0 to 1.2 mol, of ammonia per mol of $NO_x$.

In the case of ammonia as reducing agent for $N_2O$, use is made of from 0.5 to 2.0 mol, preferably from 0.8 to 1.8 mol, of ammonia per mol of $N_2O$ to be reduced.

When hydrocarbons, e.g. methane or propane, are used as reducing agent for $N_2O$, the amount required is about 0.2-1 mol of hydrocarbon/1 mol of $N_2O$ to be reduced. Preference is given to amounts of 0.2-0.7 mol of hydrocarbon/1 mol of $N_2O$ to be reduced, in particular 0.2-0.5 mol of hydrocarbon/1 mol of $N_2O$ to be reduced.

The way in which the reducing agents are introduced into the gas stream to be treated can be chosen freely for the purposes of the invention as long as the introduction occurs upstream of the second catalyst bed. It can occur, for example, in the inlet line upstream of the container for the second catalyst bed or immediately before the catalyst bed. The reducing agent can be introduced in the form of a gas or else a liquid or aqueous solution which vaporizes in the gas stream to be treated. Introduction is carried out by means of a suitable device, e.g. an appropriate pressure valve or appropriately configured nozzles, which opens into a mixer for the gas stream to be purified and the reducing agent fed in. When different reducing agents are used for $NO_x$ and $N_2O$, they can be supplied and introduced into the gas to be purified either separately or together.

In the first catalyst bed, use is made of catalysts which promote the decomposition of $N_2O$ into nitrogen and oxygen. Such catalysts are known per se and a variety of classes of substances can be used. Examples are metal-laden zeolite catalysts, for example copper- or in particular iron-laden zeolite catalysts, noble metal catalysts or transition metal oxide catalysts, e.g. catalysts containing cobalt oxide.

Examples of suitable catalysts are described, inter alia, by Kapteijn et al. in Appl. Cat. B: Environmental 9 (1996), 25-64, in U.S. Pat. No. 5,171,553, in Actes du 2ième Congrès International sur la Catalyse, Technip, Paris 1961, 1937-1953, and in WO-A-01/58,570.

When iron-laden zeolite catalysts are used in the first catalyst bed for pure $N_2O$ decomposition, the $NO_x$ still present in the gas accelerates, as expected, the desired $N_2O$ decomposition by means of an activating action as has been described for different $N_2O/NO_x$ ratios by Kögel et al. in Catal. Comm. 2 (2001) 273-6.

In the second catalyst bed, use is made of catalysts which promote the chemical reaction of $NO_x$ and/or $N_2O$ with reducing agents. Such catalysts are likewise known per se and it is likewise possible to use a variety of classes of substances. Examples are metal-laden zeolite catalysts such as copper- or cobalt-laden zeolite catalysts and in particular iron-laden zeolite catalysts and also noble metal catalysts or catalysts used in the SCR (selective catalytic reduction) process.

Preference is given to using iron-containing zeolites in the second catalyst bed and particularly preferably in the first and second catalyst beds. Here, the catalysts used in the respective catalyst beds can be different or can be the same catalysts.

Iron-laden zeolite catalysts which are particularly preferably used according to the invention comprise substantially iron-laden zeolites, preferably comprise >50% by weight, in particular >70% by weight, of one or more iron-laden zeolites. Thus, for example, the catalyst used according to the invention can comprise a Fe-ZSM-5 zeolite together with a further iron-containing zeolite, e.g. an iron-containing zeolite of the FER type.

Furthermore, the catalyst used according to the invention can contain further additives known to those skilled in the art, e.g. binders.

Catalysts used according to the invention are very particularly preferably based on zeolites into which iron has been introduced by solid-state ion exchange. For this purpose, the commercially available ammonium zeolites (e.g. $NH_4$-ZSM-5) and the appropriate iron salts (e.g. $FeSO_4 \times 7 H_2O$) are usually used as starting materials and are intimately mixed mechanically in a ball mill at room temperature (Turek et al.; Appl. Catal. 184, (1999) 249-256; EP-A-0 955 080). The catalyst powders obtained are subsequently calcined at temperatures in the range from 400 to 600° C. in air in a muffle furnace. After calcination, the iron-containing zeolites are intensively washed in distilled water, filtered off and dried. The iron-containing zeolites obtained in this way are finally treated and mixed with suitable binders and, for example, extruded to form cylindrical catalyst bodies. Suitable binders are all customarily used binders; the most frequently used binders are aluminium silicates such as kaolin.

The iron content of the zeolites which are preferably used can be up to 25%, but preferably from 0.1 to 10%, based on the mass of zeolite.

In the first catalyst bed of the method of the invention, very particular preference is given to using iron-laden zeolites of the MFI and/or FER type, in particular an iron-laden ZSM-5 zeolite.

In the second catalyst bed of the method of the invention, very particular preference is given to using iron-laden zeolites of the MFI, BEA, FER, MOR, FAU and/or MEL type, in particular iron-laden zeolites of the MFI and/or BEA type, very particularly preferably an iron-laden ZSM-5 zeolite.

The method of the invention also encompasses the use of zeolites in which part of the lattice aluminium has been isomorphously replaced by one or more elements, for example by one or more elements selected from among B, Be, Ga, Fe, Cr, V, As, Sb and Bi. Likewise encompassed is the use of zeolites in which the lattice silicon has been isomorphously replaced by one or more elements, for example by one or more elements selected from among Ge, Ti, Zr and Hf.

Precise details of the make-up or structure of the zeolites which are preferably used according to the invention are given in Atlas of Zeolite Structure Types, Elsevier, $4^{th}$ revised Edition 1996, which is hereby expressly incorporated by reference.

The method of the invention is very particularly preferably carried out using the above-defined zeolite catalysts which have been treated with steam (steamed catalysts). Such a treatment dealuminates the lattice of the zeolite; this treatment is known per se to those skilled in the art. These hydrothermally treated zeolite catalysts surprisingly display a particularly high activity in the method of the invention.

Preference is given to using hydrothermally treated zeolite catalysts which have been laden with iron and in which the ratio of extra-lattice aluminium to lattice aluminium is at least 1:2, preferably from 1:2 to 20:1.

The water content of the reaction gas is preferably <25% by volume, in particular <15% by volume. A low water content is generally to be preferred.

In general, a relatively low water concentration is preferred since higher water contents would make higher operating temperatures necessary. This could, depending on the type of zeolite used and the operating time, exceed the hydrothermal stability limits of the catalyst and thus has to be adapted to the individual case chosen.

The presence of $CO_2$ and of other deactivating constituents of the reaction gas, which are known to those skilled in the art, should also be minimized where possible, since these would have an adverse effect on the removal of $N_2O$.

The method of the invention also operates in the presence of $O_2$, since the catalysts used according to the invention have appropriate selectivities which suppress reaction of the gaseous reducing agents such as $NH_3$ with $O_2$ at temperatures of <500° C.

All these influencing factors and the chosen space velocity over the catalyst have to be taken into account in the choice of the appropriate operating temperature of the reaction zone.

The method of the invention can be used, in particular, in nitric acid production, for offgases from power stations or for gas turbines. These processes produce process gases and offgases which contain nitrogen oxides and from which the nitrogen oxides can be removed inexpensively by means of the method disclosed here. The method of the invention is advantageously used to treat the tailgas from nitric acid production downstream of the absorption tower.

The configuration of the catalyst beds can be chosen freely for the purposes of the invention. Thus, for example, the catalyst or catalysts can be located in a catalyst bed through which the gas flows axially or preferably radially. The catalyst beds can be accommodated in one or more containers.

The method of the invention is illustrated by the following examples.

The catalyst used was an iron-laden ZSM-5 zeolite. The Fe-ZSM-5 catalyst was produced by solid-state ion exchange starting from a commercially available zeolite in ammonium form (ALSI-PENTA, SM27). Detailed information on the preparation may be found in: M. Rauscher, K. Kesore, R. Mönnig, W. Schwieger, A. Tißler, T. Turek: "Preparation of highly active Fe-ZSM-5 catalyst through solid state ion exchange for the catalytic decomposition of $N_2O$" in Appl. Catal. 184 (1999) 249-256.

The catalyst powders were calcined at 823 K in air for 6 hours, washed and dried overnight at 383 K. After addition of appropriate binders, they were extruded to give cylindrical catalyst bodies.

In Examples 1 and 3, the apparatus for reducing the $NO_x$ and $N_2O$ content comprised two tube reactors which were connected in series and were charged with such an amount of the above catalyst that, based on the inflowing gas stream, a space velocity of 15 000 $h^{-1}$ resulted in the first catalyst bed and a space velocity of 40 000 $h^{-1}$ resulted in the second catalyst bed. $NH_3$ gas is introduced between the two reaction zones. In Example 1 (not according to the invention), ammonia was added in the amount (525 ppm) required for $NO_x$ reduction. In Example 3 (according to the invention) an additional amount of ammonia was added for $N_2O$ reduction (total of 925 ppm).

Example 2, which was not according to the invention, was carried out in an apparatus which corresponded to the above-described apparatus except that only the second tube reactor was present (space velocity of 40 000 $h^{-1}$). In Example 2, ammonia was added in such an amount (total of 1800 ppm) that not only the $NO_x$ but also part of the $N_2O$ was chemically removed, but without a preceding decomposition stage for $N_2O$.

The operating temperature in the reaction zones was set by heating. The analysis of the gas streams entering and leaving the reactors was carried out by means of an FTIR gas analyzer.

The inlet concentrations on entry into the experimental apparatus were: about 1100 ppm of $N_2O$, about 430 ppm of $NO_x$, about 3000 ppm of $H_2O$ and about 1% by volume of $O_2$ in $N_2$.

The amounts of ammonia indicated in the following tables were introduced between the first and second catalyst beds or in the case of Example 2 at the inlet of the tube reactor. The reactors were operated at a uniform operating temperature of 430° C. and a uniform operating pressure of 6.5 bar. The results are shown in the following and a uniform operating pressure of 6.5 bar. The results are shown in the following tables.

TABLE 1

Example 1

|  |  | Inlet concentration (ppm) | Outlet concentration (ppm) | Degree of removal (%) |
|---|---|---|---|---|
| Catalyst bed 1 | $N_2O$ | 1094 | 305 | 72 |
|  | $NO_x$ | 436 | 432 | 0 |
| Catalyst bed 2 | $NH_3$ | 525 | 0 | 100 |
|  | $NO_x$ | 432 | 9 | 98 |
|  | $N_2O$ | 305 | 237 | 22 |
| Total | $N_2O$ |  |  | 78 |
|  | $NO_x$ |  |  | 98 |

TABLE 2

Example 2

|  |  | Inlet concentration (ppm) | Outlet concentration (ppm) | Degree of removal (%) |
|---|---|---|---|---|
| Catalyst bed | $NH_3$ | 525 | 0 | 100 |
|  | $NH_3$ | 1275 | 0 | 100 |
|  | $N_2O$ | 1108 | 85 | 92 |
|  | $NO_x$ | 439 | 0 | 100 |
| Total | $N_2O$ |  |  | 92 |
|  | $NO_x$ |  |  | 100 |

TABLE 3

Example 3

|  |  | Inlet concentration (ppm) | Outlet concentration (ppm) | Degree of removal (%) |
|---|---|---|---|---|
| Catalyst bed 1 | $N_2O$ | 1087 | 308 | 72 |
|  | $NO_x$ | 435 | 434 | 0 |
| Catalyst bed 2 | $NH_3$ | 525 | 0 | 100 |
|  | $NH_3$ | 400 | 0 | 100 |
|  | $NO_x$ | 434 | 0 | 100 |
|  | $N_2O$ | 308 | 33 | 89 |
| Total | $N_2O$ |  |  | 97 |
|  | $NO_x$ |  |  | 100 |

The results from Table 1 show that when a two-stage method is carried out in a manner which is not according to the invention, with in the second stage the $NO_x$ being removed by chemical reaction with a reducing agent and the $N_2O$ being removed by catalytic decomposition to nitrogen and oxygen, a high degree of removal of $NO_x$ is achieved but only a small part of the $N_2O$ is removed.

The results from Table 2 show that although a single-stage method which is not according to the invention and in which both $NO_x$ and $N_2O$ are removed by chemical reaction with a reducing agent achieves a high degree of removal of nitrogen oxides, very large amounts of reducing agent have to be used.

The results from Table 3 show that when a two-stage method is carried out according to the invention, with the major part of the $N_2O$ being catalytically decomposed in the first stage and both $NO_x$ and $N_2O$ being removed by chemical reaction with a reducing agent in the second stage, a very high degree of removal of $NO_x$ and $N_2O$ is achieved at a usage of reducing agent which is significantly lower than in Example 2.

The invention claimed is:

1. A method for reducing the content of $N_2O$ and $NO_x$ in gases, comprising:
   a) passing the $N_2O$- and $NO_x$-containing gas over two catalyst beds, wherein the first catalyst bed contains a catalyst for decomposing $N_2O$ into nitrogen and oxygen and the second catalyst bed contains a catalyst for chemically reacting $N_2O$ and $NO_x$ with a reducing agent;
   b) selecting temperature, pressure, and space velocity in said first catalyst bed so that the decrease of $N_2O$ content of the gas is not more than 95%, based on the $N_2O$ content of the gas at the entrance of said first catalyst bed, and
   c) adding a reducing agent for $N_2O$ and a reducing agent for $NO_x$ between the first and second catalyst beds in an amount sufficient to chemically remove all of the $NO_x$ and at least 50% of the $N_2O$, based on the $N_2O$ content of the gas at the entrance of said second catalyst bed.

2. The method of claim 1, wherein temperatures of less than 500° C. are set in the first and second catalyst beds.

3. The method of claim 1, wherein gas pressures of at least 2 bar are set in the first and second catalyst beds.

4. The method of claim 1, wherein the $N_2O$- and $NO_x$-containing gas is passed over said catalyst beds at a space velocity of from 5000 to 50 000 $h^{-1}$, based on the summed catalyst volume of the two catalyst beds.

5. The method of claim 1, wherein at least one metal-laden zeolite catalyst is used in at least one of said catalyst beds.

6. The method of claim 5, wherein said at least one metal-laden zeolite catalyst is of the MFI, BEA, FER, MOR, FAU, and/or MEL type.

7. The method of claim 6, wherein said at least one metal-laden zeolite catalyst in the first catalyst bed is an iron-laden zeolite of the MFI and/or FER type.

8. The method of claim 6, wherein said at least one metal-laden zeolite catalyst in the second catalyst bed is an iron-laden zeolite of the MFI and/or BEA type.

9. The method of claim 6, wherein said at least one metal-laden zeolite catalyst in the first and second catalyst beds are an iron-laden zeolite of the MFI type.

10. The method of claim 1, wherein iron-laden zeolites which have been treated with steam are used in at least one catalyst bed.

11. The method of claim 1, wherein iron-laden zeolites in which the ratio of extra-lattice aluminium to lattice aluminium is at least 0.5 are used as catalysts in at least one catalyst bed.

12. The method of claim 11, wherein ammonia is used as reducing agent for $NO_x$ and hydrocarbons are used as reducing agent for $N_2O$.

13. The method of claim 12, wherein the hydrocarbons are used as reducing agents for $N_2O$ in an amount of 0.2 to 1.0 mol per mol of $N_2O$ to be removed.

14. The method of claim 1, wherein nitrogen-containing reducing agents, hydrocarbons, carbon monoxide, hydrogen, or mixtures containing at least two of these components are used as reducing agents for $NO_x$ and as reducing agents for $N_2O$.

15. The method of claim 1, wherein ammonia is used as reducing agent for $NO_x$ and as reducing agent for $N_2O$.

16. The method of claim 15, wherein ammonia is used as reducing agent for $NO_x$ in an amount of from 0.9 to 2.5 mol per mol of $NO_x$ to be removed and ammonia is used as reducing agent for $N_2O$ in an amount of from 0.5 to 2.0 mol per mol of $N_2O$ to be removed.

17. The method of claim 1, wherein it is integrated into the process for nitric acid production.

18. The method of claim 1, wherein it is integrated into the process of operating a gas turbine.

19. The method of claim 1, wherein it is integrated into the process of operating a power station.

* * * * *